UNITED STATES PATENT OFFICE.

JOHN R. MARDICK, OF NEW YORK, N. Y., ASSIGNOR TO ACHESON GRAPHITE COMPANY, OF NIAGARA FALLS, NEW YORK, A CORPORATION OF NEW JERSEY.

EXPLOSIVE.

1,415,889.  Specification of Letters Patent.   Patented May 16, 1922.

No Drawing.   Application filed July 29, 1921.  Serial No. 488,460.

*To all whom it may concern:*

Be it known that I, JOHN R. MARDICK, a citizen of the United States, residing at New York, in the county of New York, State of New York, have invented certain new and useful Improvements in Explosives; and I do hereby declare the following to be a full, clear, and exact description of the invention, such as will enable others skilled in the art to which it appertains to make and use the same.

This invention relates to improvements in explosives and more particularly to improvements in black blasting powders which are glazed with an improved and characteristic glaze.

It is common practice to glaze black blasting powders with so-called natural graphite, and, for this purpose, two grades of natural graphite are commonly used, namely, fine graphite and flake graphite. Sometimes a mixed graphite is used containing both fine and flaked natural graphite. When the fine and flaked graphite are not used in admixture, the flake graphite is commonly added during the last stages of the glazing, for the purpose of completing the glazing operation.

The material commonly called natural graphite varies a great deal in its composition and properties. Even materials which, on analysis, show the same high carbon content which indicates a high grade graphite, may show entirely different results when used for glazing, and some may be entirely unsuited for that purpose. Moreover, the inorganic constituents of the artificial graphite vary with different graphites. These differences in the inorganic constituents, and in the form in which the inorganic constituents are present, as well as the differences in the crystalline or physical structure of the graphite itself, may not only give difficulty in obtaining a satisfactory glazing of the powder, but may likewise give objectionable variations in the finished product, that is, in the glazed powder.

Variations of this character in the glazed powder are objectionable and make it difficult for the powder manufacturer to produce a glazed powder of the desired uniform properties, even where the powder grains themselves may be entirely uniform. In other words, the glazing of natural graphite, although it makes up but a small part of the entire powder grains, is nevertheless present at the surface of the grains, where it influences the propagation of the explosion.

The present invention is based upon the discovery that black blasting powder can be given an improved and superior glaze by the use of the material known as artificial or electrically produced graphite as the glazing material. I have found not only that the artificial graphite can be used as a satisfactory glazing, but that the powder glazed therewith has characteristic and distinguishing properties and advantages.

The material which I use for the glazing of the black blasting powder is the material known as artificial or electrically produced graphite. Although it has the same name (graphite) as the naturally occurring graphite, nevertheless it differs considerably from the natural product both in its composition and in its properties. I may use either freshly prepared artificial graphite or I may use graphite that is available as waste or scrap material, for example, that obtained from electrodes, crucibles, etc. The artificial graphite is subjected to proper grinding and sizing so that it is converted into a powder of appropriate size, e. g., with particles passing through a 200 mesh sieve. Such graphite will always contain over 95 per cent of carbon.

Freshly prepared artificial graphite will be made up entirely of graphite, i. e. it will be free from ungraphitized carbon. When, however, the artificial graphite is used for other purposes, such as electrodes or carbons, crucibles, etc., it is usual to admix the graphite with a carbonaceous binder (such as coal tar or coal tar pitch) which is then baked and carbonized or graphitized, so that the graphite article is of a composite character, made up of the original graphite and the carbonized or graphitized binder. When such articles, after use, are ground into a powder, the resulting powder will be of a similar composite character. I have found that the graphite from such scrap or waste materials is particularly advantageous for use according to the present invention.

The glazing operation can be carried out in rotary glazing barrels about 6 feet in diameter by 8 feet long and with a charge made up of about 150 kegs of powder and 5 to 7 pounds of the finely divided artificial graphite. The powder may be partly dried before putting it into the glazing barrel or the moisture may be removed during the revolution of the glazing barrel. The temperature is kept at about 185°–190° F. and hot or cold air may be introduced to secure temperature control and the progressive driving away of moisture. The barrel may have a rate of revolution between 8 and 20 revolutions per minute. When about 90% of the moisture has been driven off and removed, the finely divided artificial graphite, for example, about 5 to 7 pounds, can be added. A certain amount of moisture seems to be necessary or advantageous to bring about proper glazing. Depending upon the rate of rotation of the glazing barrel, the glazing operation may require, for example, from 12 to 20 hours.

When the artificial graphite is used in the manner described, the powder is provided with a characteristic glaze which fills or covers the pores of the powder to make them moisture resisting, removes dullness and gives a decided shine and brilliancy so that the powder is made more attractive in appearance and so that the glazed powder is made smooth running and easy pouring, while sizing of the powder into different grades is facilitated and dusting and crumbling of the powder is prevented or minimized before and during use. I have found that the artificial graphite can be satisfactorily used without the necessity for admixing flake graphite, such as is commonly used when natural graphite is employed.

The glazed powder, glazed with the artificial graphite, presents among others the following characteristic advantages, namely, uniformity in carbon and mineral or inorganic content, with increased amount of carbon and decreased mineral content; improved covering and moisture resisting qualities; increased sensitiveness; uniform progression of fire and uniform velocity of explosion during explosion; uniformity of the glazing as against the partly amorphous and partly flaky natural graphite; the avoidance of the necessity of using another grade of graphite (flake graphite), and the necessity for a second glazing operation for the flake graphite; reduction in the cost of the glazing operation; and elimination of any necessity for adulteration which is practiced at the present time in an attempt to cover up the lack of uniformity in the natural graphite.

I claim:

1. Black blasting powder provided with a characteristically uniform glaze of finely divided amorphous electrically produced graphite, such powder being characterized by improved covering and moisture resisting qualities, uniformity of carbon and mineral content, increased sensitiveness, uniform progression of fire and uniform velocity of explosion.

2. Black blasting powder provided with a characteristically uniform glaze of finely divided amorphous electrically produced graphite, made by grinding waste or scrap graphite articles, such powder being characterized by improved covering and moisture resisting qualities, uniformity of carbon and mineral content, increased sensitiveness, uniform progression of fire and uniform velocity of explosion.

In testimony whereof I affix my signature.

JOHN R. MARDICK.